Oct. 27, 1936.  S. G. BAITS  2,058,550
CLUTCH CONTROLLING MECHANISM
Filed Jan. 19, 1932  5 Sheets-Sheet 2
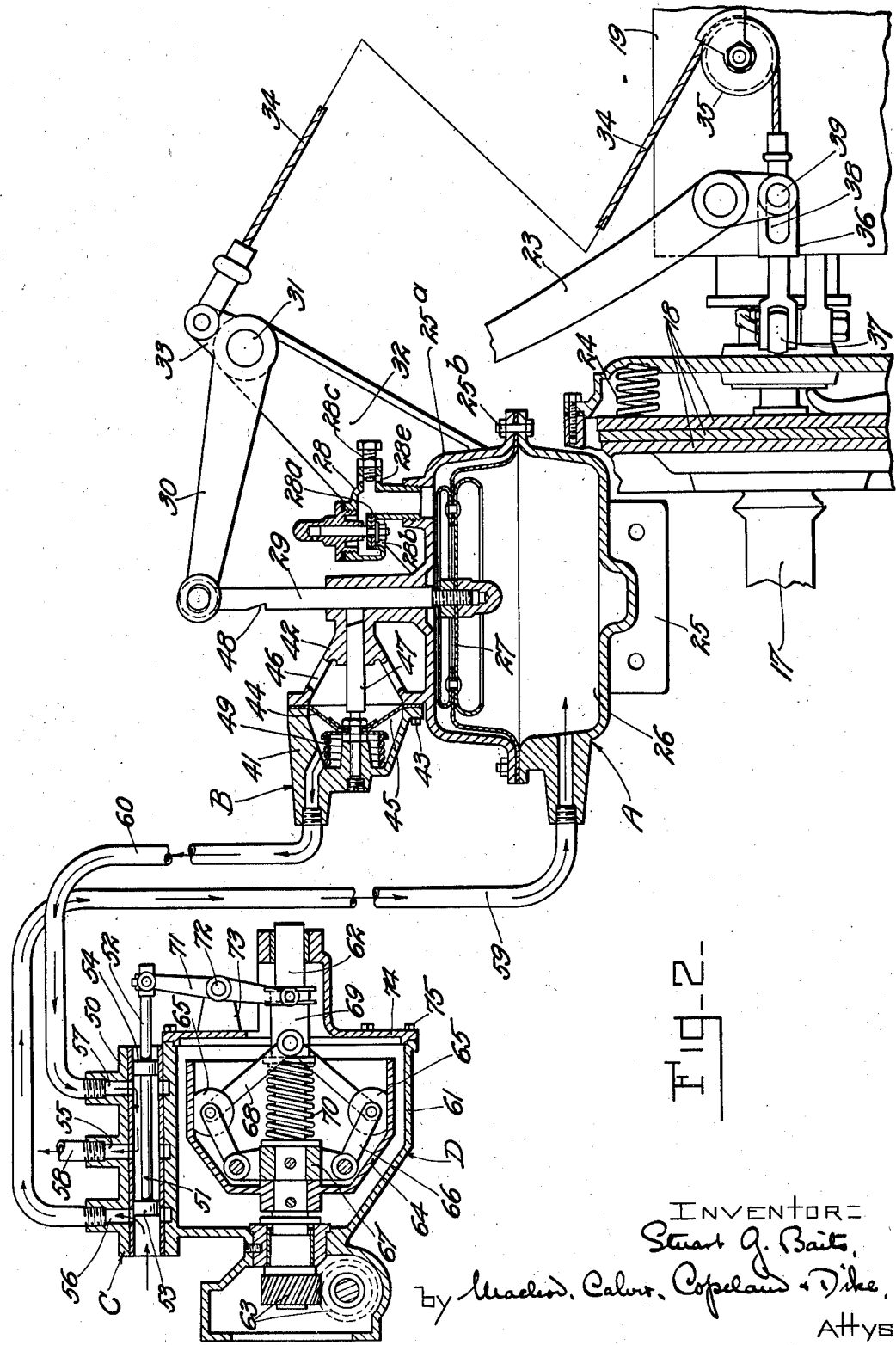
Fig-2-
INVENTOR:
Stuart G. Baits,
by Macleod, Calvert, Copeland & Dike,
Attys.

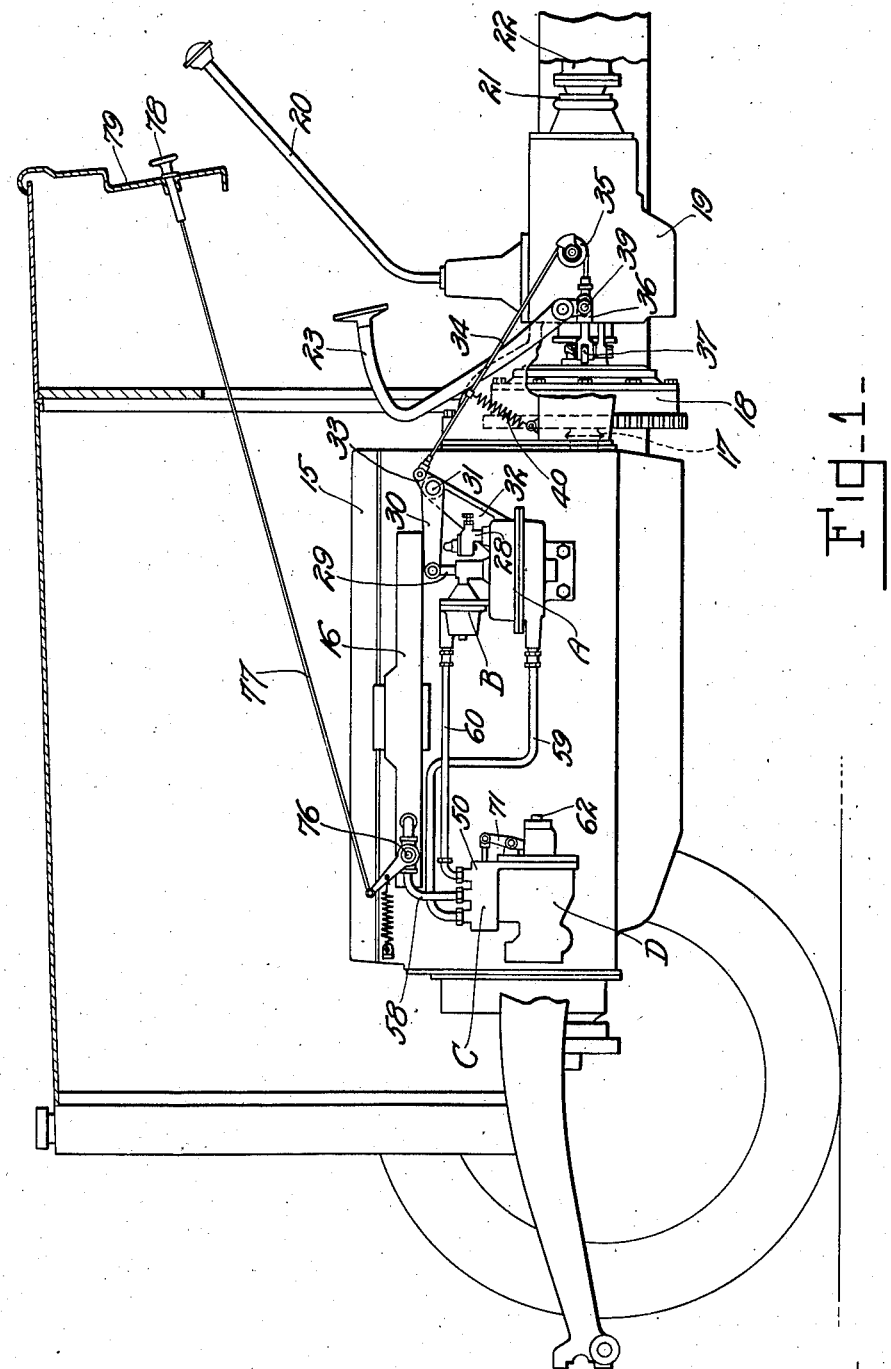

Oct. 27, 1936.　　　　S. G. BAITS　　　　2,058,550
CLUTCH CONTROLLING MECHANISM
Filed Jan. 19, 1932　　5 Sheets-Sheet 3
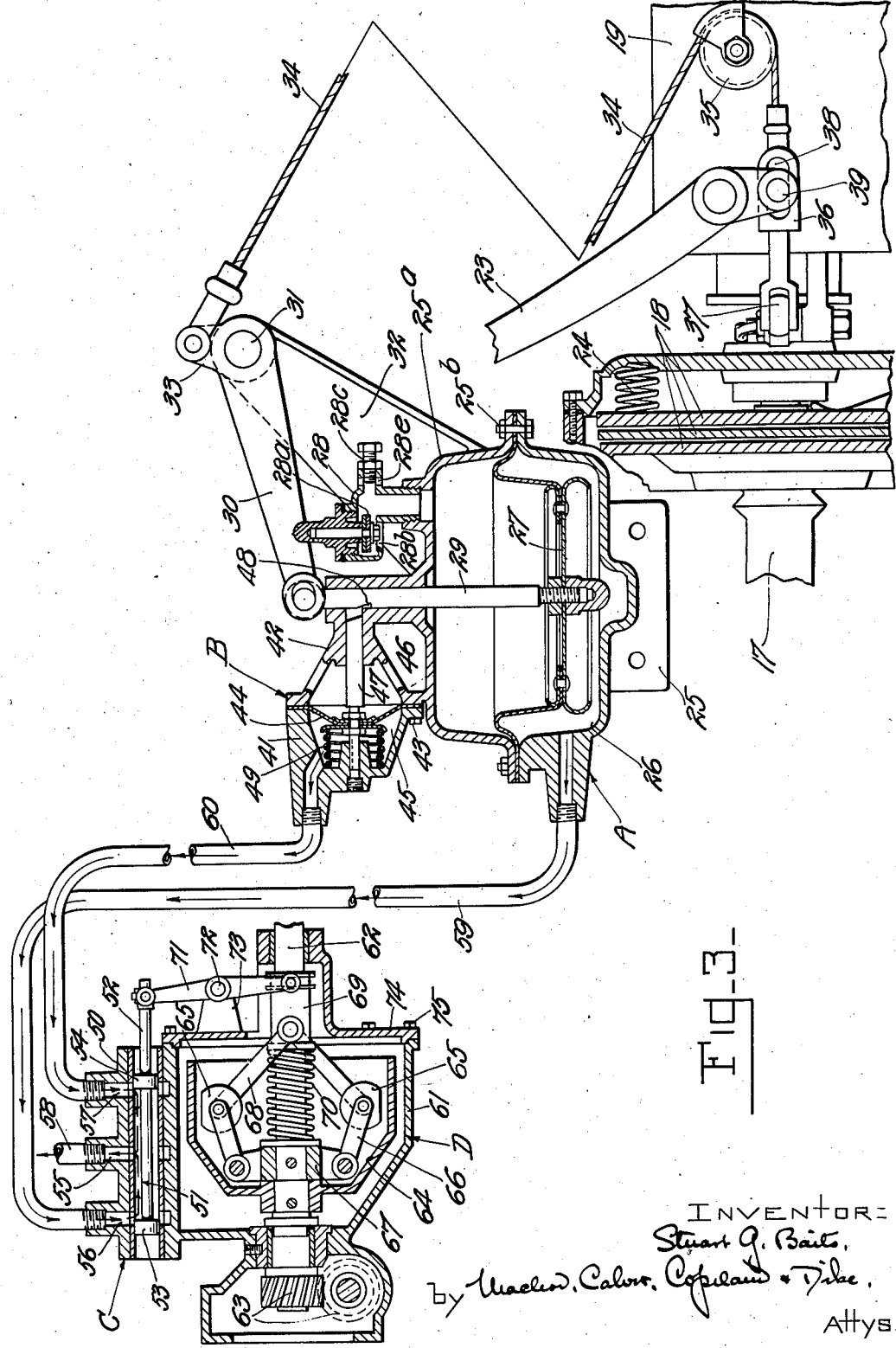
Fig-3-
INVENTOR:
Stuart G. Baits,
by MacLeod, Calvert, Copeland & Dike,
Attys.

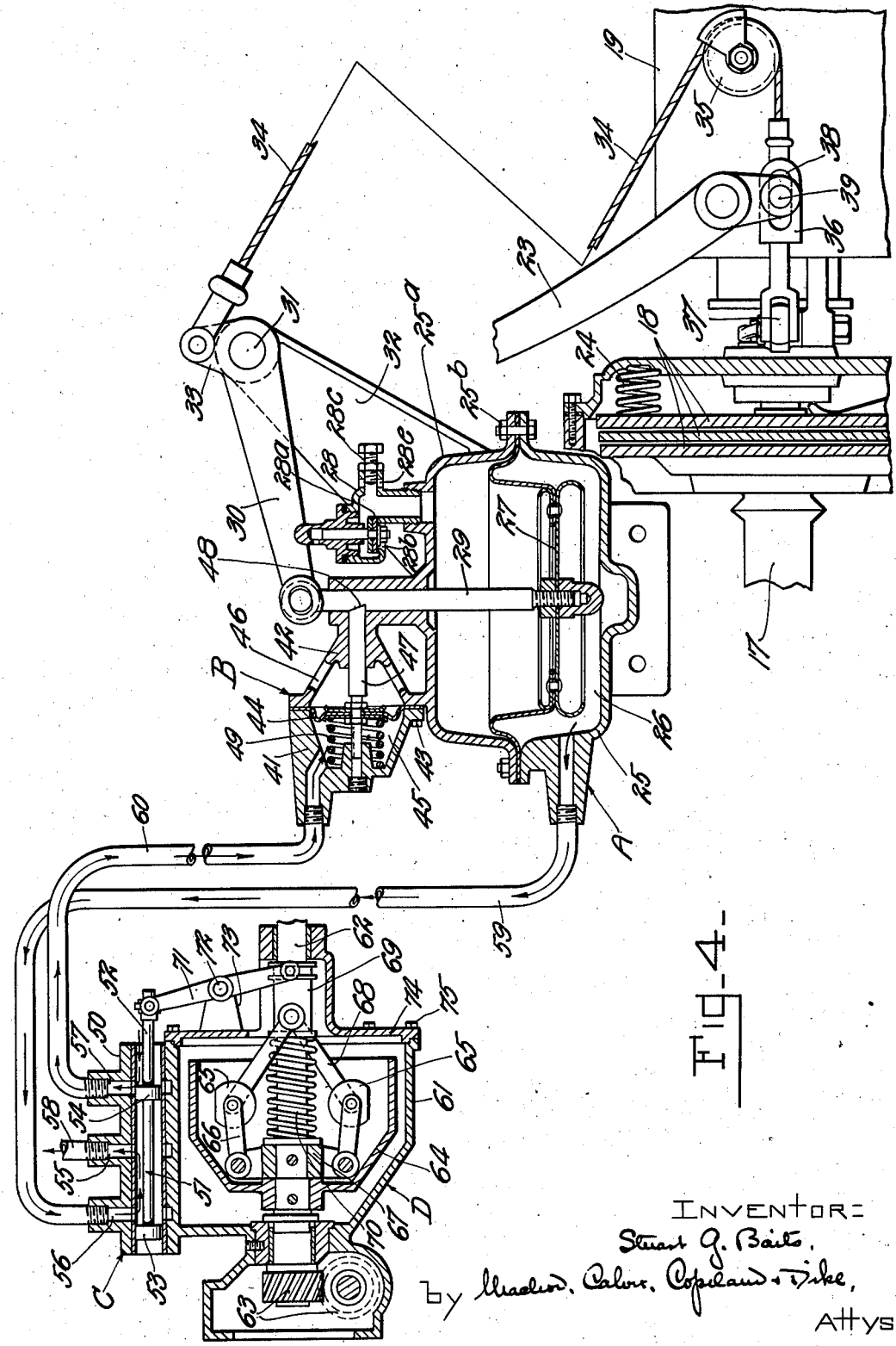

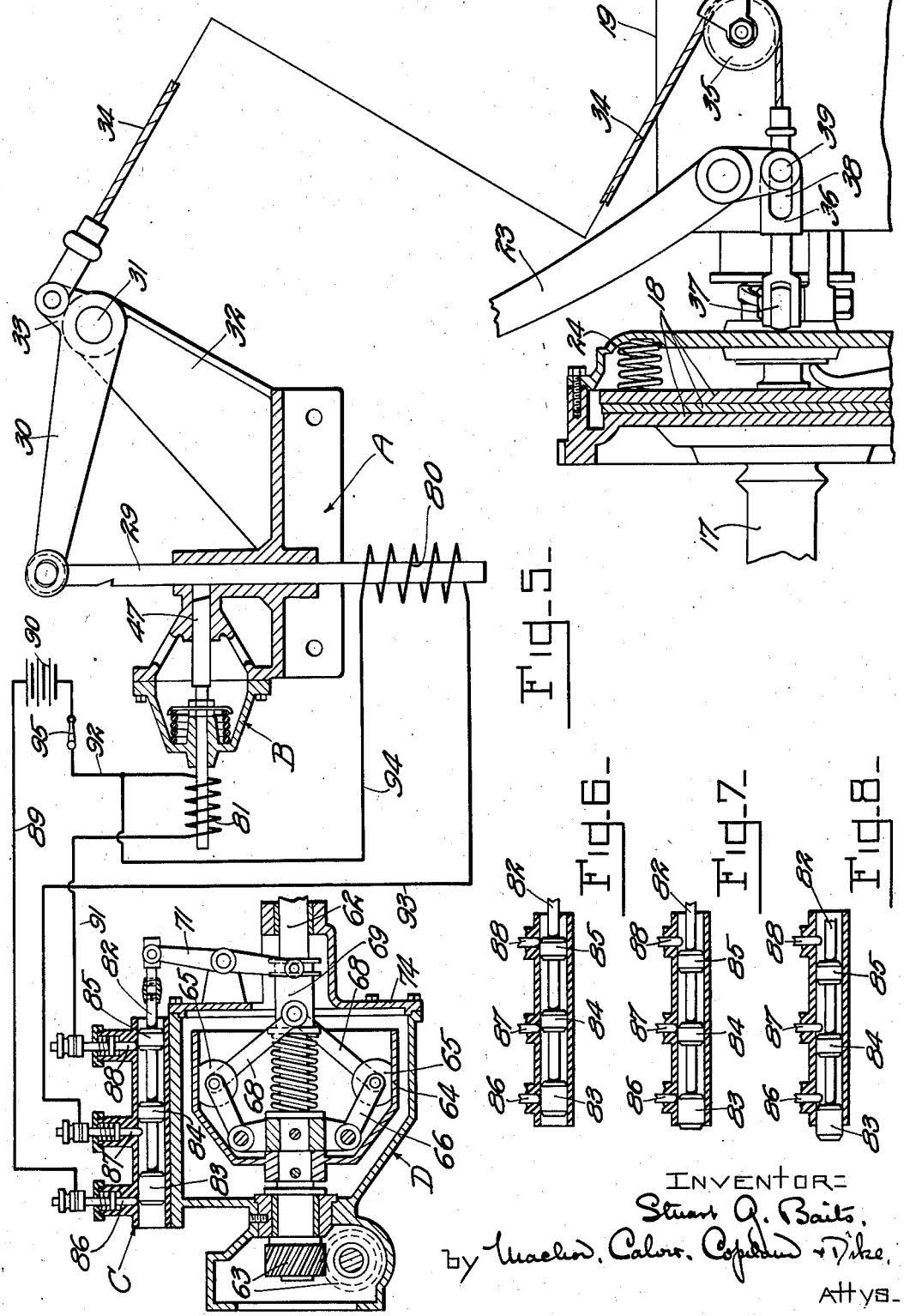

Patented Oct. 27, 1936

2,058,550

UNITED STATES PATENT OFFICE 2,058,550

CLUTCH CONTROLLING MECHANISM

Stuart G. Baits, Grosse Pointe Park, Mich., assignor to Hudson Motor Car Company, Detroit, Mich., a corporation of Michigan Application January 19, 1932, Serial No. 587,499

9 Claims. (Cl. 192—91)

The modern motor vehicle, equipped with a transmission including gear synchronizing and free wheeling devices, can be operated without releasing or disengaging the main clutch at any time except when stopping or when starting from a complete stop. In order further to simplify the operation of such a vehicle it is desirable that the necessity for manual control of the main clutch be entirely eliminated, making it unnecessary, under normal conditions, for the driver to do anything but move the gear shift lever into the desired position and operate the throttle and brakes to start or stop the car or to increase or decrease its speed.

In order to accomplish this it is necessary to provide automatic means for disengaging the main clutch at very low car speeds and for engaging the same when the speed increases. Some attempts have been made to solve this problem by incorporating centrifugal weights in the main clutch itself, which reduce the spring pressures at low speeds to a point where the clutch will slip. These devices are very heavy and bulky, difficult to keep in balance, cause excessive wear of the clutch faces, and cannot as a rule be rendered inoperative at will, which is sometimes necessary or desirable. Attempts have also been made to provide means for disengaging the clutch by the suction or partial vacuum in the intake manifold of the engine under the control of mechanical connections with the throttle, but such arrangements have the disadvantage of always disengaging the clutch when the throttle is closed, even at very high speeds. Also, in such arrangements stalling or other stopping of the engine results in the reengaging of the clutch, necessitating its manual disengagement, or the shifting of the transmission gears into neutral, in order to start the engine, and making the use of automatic self-starters impracticable.

The present invention has for its object to avoid the above difficulties and to provide an apparatus whereby the main clutch is held in engagement (subject, however, to manual control when necessary) so long as the engine speed is above a predetermined limit, is automatically disengaged when the engine speed falls below said limit, is locked in disengaged condition when the engine stops, and is automatically unlocked and reengaged when the speed of the engine increases above a predetermined point. To this end, the invention contemplates the provision of power operated means, either pneumatic, electric or otherwise, for disengaging the clutch under the control of a mechanical governor driven by the engine. Accordingly, in practice, the motor of the vehicle may be started with the gear shift lever moved into the desired driving speed position, and the vehicle driven away simply by opening the throttle and without attention to the main clutch. Approaching a stop, it is merely necessary to apply the brakes and the clutch will be automatically disengaged when the speed of the vehicle has been reduced to a predetermined limit. Means are also preferably provided for rendering the automatic control inoperative at will and to provide for the manual operation of the clutch by the usual clutch pedal.

The foregoing and other objects of the invention, together with means whereby the same may be carried into effect, will best be understood from the following description of certain forms or embodiments thereof illustrated in the accompanying drawings. It will be understood, however, that the particular constructions and arrangements described and shown have been chosen for illustrative purposes merely, and that the invention, as defined by the claims hereunto appended, may be otherwise embodied without departure from its spirit and scope.

In said drawings

Fig. 1 is a fragmentary and somewhat conventionalized view of a portion of a motor vehicle equipped with clutch controlling mechanism embodying the invention.

Fig. 2 is an enlarged fragmentary diagrammatic view including sectional details of certain of the parts constituting the clutch controlling system and showing the positions assumed by the several parts when the engine is running at normal or relatively high speed with the main clutch engaged.

Fig. 3 is a view similar to Fig. 2 showing the positions assumed by the parts when the speed of the engine falls below a predetermined limit, resulting in the automatic disengagement of the clutch.

Fig. 4 is a similar view showing the positions assumed by the parts when the speed of the engine is further decreased and just prior to stopping.

Fig. 5 is a view similar to Fig. 2 illustrating a modification.

Figs. 6, 7, and 8 are detail views illustrating the positions assumed by the controller switch shown in Fig. 5 under different running conditions.

In Fig. 1 is shown a portion of a motor vehicle including an engine 15 having an intake manifold 16 and a crank shaft 17. At 19 is shown the transmission, the driving shaft of which is connected with the crank shaft 17 by the main clutch 18, and the driven shaft of which is connected by the front universal 21 with the propeller shaft 22 by which the power is transmitted to the rear axle (not shown). At 20 is shown the gear shift lever for controlling the transmission 19, and at 23 the main clutch pedal which, when depressed, operates, through suitable connections, to disengage the main clutch 18, the latter being automatically engaged, when the clutch pedal is released, by the usual springs 24 (see Fig. 2). Except as hereinafter pointed out, the parts above referred to may all be of any usual or suitable construction and arrangement.

In accordance with the present invention, means are provided for automatically disengaging and controlling the clutch 18 independently of the clutch pedal 23 by power from a suitable source under the control of means responsive to the engine speed. The apparatus comprises a clutch disengaging element A and a clutch locking element B adapted to receive power from a suitable source under the control of a controlling element C which is operated by a governor D driven by the engine 15.

Referring to Fig. 2, the clutch disengaging element A comprises a two part casing having a body portion 25 bolted or otherwise secured to the engine block and a cover portion 25ª secured to said body portion by bolts 25ᵇ, said portions clamping between them the margin of a diaphragm 27. The body portion 25 provides, at one side of the diaphragm, a fluid pressure chamber 26, while the space within the cover portion 25ª at the opposite side of the diaphragm is vented to the atmosphere through a valve housing 28. The valve housing 28 contains an inwardly opening check valve 28ª, which controls a port 28ᵇ communicating with the atmosphere, and a manually adjustable screw or needle valve 28ᶜ which controls one or more bleeder parts 28ᵉ likewise communicating with the atmosphere. The diaphragm 27 is secured to a stem 29 guided for longitudinal movement in the cover portion 25ª and connected at its outer end with one arm 30 of a bell crank lever pivoted at 31 to a fixed support 32 carried by and preferably formed integral with the cover portion 25ª. The other arm 33 of the bell crank lever is connected by a cable or other flexible connector 34, passing around a sheave 35 rotatably mounted at the side of the transmission casing, with a link 36 which in turn is connected with the releasing member or lever 37 of the main clutch 18. The link 36 is formed with a slot 38 to receive a stud 39 carried by the lower end of the clutch pedal 23, providing a lost motion connection whereby the link 36 may be operated to disengage the clutch 18 by the connector 34 without operating the clutch pedal 23. On the other hand the clutch can be disengaged at any time by operation of the clutch pedal 23, the cable 34 at this time becoming slack, and the slack being preferably taken up by a spring 40 (Fig. 1) connecting said cable with the main clutch casing.

The clutch locking element B likewise comprises a two-part casing including portions 41 and 42, the latter of which may conveniently be formed integral with the cover portion 25ª of the casing of the clutch disengaging element A. The portions 41 and 42 are secured together by bolts 43 and clamp between them the margin of a diaphragm 44. The portion 41 provides at one side of the diaphragm a fluid pressure chamber 45, while the space within the portion 42 at the opposite side of the diaphragm is vented to the atmosphere as indicated at 46. The diaphragm 44 is secured to a latch member 47 guided for longitudinal movement, in a direction transverse to the movement of the stem 29, in the combined casing portions 25ª, 42, said latch member having a preferably bevelled end adapted to engage a notch 48 in the stem 29. Interposed between the diaphragm 44 and the outer end of the fluid pressure chamber 45 is a spring 49 tending normally to urge the diaphragm 44 and latch member 47 toward the stem 29.

The controlling element C comprises a cylindrical valve casing 50 open at its ends to the atmosphere and containing an axially movable piston valve 51 comprising a stem 52 and two heads 53 and 54. The casing 50 is provided with three lateral ports 55, 56 and 57. The port 55, which is located between the ports 56 and 57, is connected by a conduit 58 with the intake manifold 16. The port 56 is connected by a conduit 59 with the fluid pressure chamber 26 of the clutch disengaging element A while the port 57 is connected by a conduit 60 with the fluid pressure chamber 45 of the clutch locking element B.

The governor D comprises a housing 61 with which the valve casing 50 can conveniently be formed integral. Journalled in suitable bearings in the housing 61 is a shaft 62 connected, as by gearing generally indicated at 63, with some shaft driven by the engine 15, as, for example, the crank shaft, generator shaft, pump shaft, timer shaft, or otherwise, whereby said shaft 62 is likewise driven by the engine at a speed proportional to the engine speed. Mounted on the shaft 62 within the housing 61 is a bell shaped drum 64 rotating with the shaft and enclosing a pair of governor weights 65. The governor weights 65 are carried by arms 66 pivoted to a collar 67 likewise fast on the shaft 62. The outer ends of the arms 66, by which the weights 65 are carried, are connected by links 68 with a collar 69 adapted to slide on the shaft 62. Interposed between the collars 67 and 69 is a spring 70 arranged to be compressed when the weights 65 move outwardly with increasing engine speed, the outward movement of said weights, and the consequent sliding movement of the sleeve 69 toward the left or inwardly of the housing, being limited by engagement of said weights with the cylindrical wall of the drum 64. The sleeve 69 is connected with the stem 52 of the valve 51 by a lever 71 fulcrumed at 72 to a lug 73 on the cover 74 of the housing 61, which cover is suitably secured to said housing as by bolts 75.

The operation of the mechanism above described, is as follows:

At engine speeds above a predetermined limit, say 400 R. P. M., the governor weights 65 rest against the wall of the rotating drum 64 as shown in Fig. 2. At this time the valve 51 is in a position to open the port 56 to the atmosphere and to connect the port 57 with the port 55. Manifold vacuum is, therefore, applied to the fluid pressure chamber 45, causing the diaphragm 44 and latch member 47 to be held in retracted position against the tension of the spring 49. At the same time atmospheric pressure is admitted to the fluid pressure chamber 26, so that the pressures on the opposite sides of the diaphragm 27 are balanced (due to the atmospheric vent afforded by the bleeder ports 28ᵉ) and the clutch 18 is held engaged by its springs 24.

With the decrease of engine speed below the predetermined limit above referred to the governor weights 65 move inwardly under the influence of the spring 70, moving the valve 51 into the position shown in Fig. 3, wherein the ports 56 and 57 are both connected with the port 55. The fluid pressure chambers 26 and 45 are, therefore, both subjected to manifold vacuum, the latch 47 is still held retracted, and the diaphragm 27 and stem 29 are moved into the position shown to disengage the clutch 18 through the connections above described. During this movement, the check valve 28a opens, admitting a free flow of atmospheric air into the space above the diaphragm, and permitting a quick disengagement of the clutch.

When the engine speed falls below a second and lower predetermined limit, say 250 R. P. M., the valve 51 is moved into the position shown in Fig. 4, wherein the port 57 is open to the atmosphere and the port 56 is connected with the port 55. The fluid pressure chamber 26 is therefore still subjected to manifold suction to hold the clutch 18 disengaged, while atmospheric pressure is admitted to the fluid pressure chamber 45, thereby equalizing the pressures on the opposite sides of the diaphragm 44 and permitting the spring 49 to engage the latch member 47 with the notch 48, thereby locking the clutch 18 in disengaged position. Thereafter when the speed of the engine is further decreased, or when said engine stops completely, so as to relieve the fluid pressure chamber 26 of manifold vacuum, the clutch 18 is locked in disengaged position and remains so until the engine is again started. The range of movement of the diaphragm 27 and stem 29 is preferably such as to carry the notch 48 slightly beyond the latch 47, as shown in Fig. 3, when the clutch is first disengaged, but as soon as the engine stops or slows down to the point where the vacuum in the chamber 26 is insufficient to hold the stem 29 against the force of the clutch springs 24, said stem will move outwardly slightly and the latch 47, under the influence of the spring 49, will snap into said notch.

When the engine is again started and speeded up to a point above the lower predetermined limit above referred to, the operations are the reverse of those above described. That is to say, the governor weights 65 and valve 51 are first moved into the position shown in Fig. 3 to apply manifold vacuum to the chamber 45 and retract the latch 47 and also to apply manifold vacuum to the chamber 26, holding the clutch disengaged. When the engine is further speeded up to the higher predetermined limit first above referred to, the parts move into the position shown in Fig. 2, wherein the pressure chamber 45 is still subjected to manifold vacuum to hold the latch 47 disengaged, but atmospheric pressure is admitted to the chamber 26 to equalize the pressures on the diaphragm 27 and permit the clutch springs 24 to engage the clutch. The upward movement of the diaphragm 27 to permit engagement of the clutch is retarded by the slow escape of air through the bleeder ports 28e, as determined by the adjustment of the valve 28c, the check valve 28a being at this time closed, thereby cushioning the clutch engagement and preventing objectionably sudden action thereof.

As shown in Fig. 1, the conduit 58 connecting the valve chamber 50 with the intake manifold 16 is preferably provided with a valve 76 adapted for manual operation through connections, generally indicated by 77, with a handle 78 on the instrument board 79 of the car, whereby said valve may be closed to shut off communication between the manifold 16 and valve chamber 50, thereby rendering the automatic clutch controlling mechanism inoperative and leaving the clutch under the control of the clutch pedal 23 exclusively.

In Fig. 5 is illustrated a modification of the invention adapted for electric instead of pneumatic operation. In this modification, the governor D may be substantially identical with that in the form of the invention first described, but for the fluid pressure devices of the clutch disengaging element A and clutch locking element B, are substituted solenoids 80 and 81 for operating the stem 29 and latch member 47, respectively. The controlling element C comprises, instead of a valve mechanism, a switch comprising a movable switch element 82 connected with the lever 71 and having three movable contact members 83, 84 and 85 cooperating respectively with relatively fixed contact members 86, 87 and 88. The contact member 86 is connected by a conductor 89 with one pole of a battery 90 or other source of electric energy, or these two terminals may, if desired, both be grounded. The contact member 88 is connected by a conductor 91 with one end of the winding of the solenoid 81, the opposite end of said winding being connected with the other pole of the battery 90 by a conductor 92. The contact member 87 is connected by a conductor 93 with one end of the winding of the solenoid 80, the opposite end of which is connected by a conductor 94 with the conductor 92.

When the engine is running at a speed above the higher predetermined limit, the governor and switch are in the positions shown in Fig. 5, wherein the contact member 83 engages the contact member 86, and the contact member 85 engages the contact member 88, but the contact members 84 and 87 are disengaged. The circuit through the solenoid 81 is therefore closed and said solenoid energized to hold the latch 47 retracted, while the circuit through the solenoid 80 is open and said solenoid therefore de-energized permitting the springs 24 to engage the clutch 18. When the speed of the engine decreases below the higher predetermined limit, the switch 82 is moved into the position shown in Fig. 6, wherein all the pairs of contact members are in engagement. The circuits through both solenoids 80 and 81 are therefore closed and said solenoids both energized, the former to disengage the clutch 18 and the latter to hold the latch 47 in retracted position. When the speed of the engine falls below the lower predetermined limit above referred to, the switch 82 assumes the position shown in Fig. 7, wherein the circuit through the contact members 85 and 88 is opened, those through the contact members 83, 86 and 84, 87 remaining closed. The solenoid 81 is accordingly de-energized, so that, when the engine comes to a full stop, and the switch 82 is moved into the position shown in Fig. 8 wherein all of the circuits are opened, the latch member 47 will lock the clutch in disengaged position.

Preferably, and as shown in Fig. 5, a manually operated switch 95, corresponding in function to the manually operated valve 76 of the form of the invention first described, is interposed in the conductor 92 between the battery 90 and the point of connection of the conductor 94, said switch when opened, disconnecting both solenoids from the battery, and rendering the automatic clutch controlling mechanism inoperative.

Having thus described my invention, I claim:

1. In a motor vehicle, in combination, an engine, a governor driven thereby, a clutch through which the power of the engine is transmitted to the vehicle, means controlled by said governor for disengaging said clutch when the speed of said engine is below a predetermined limit, and means likewise controlled by said governor for locking said clutch in disengaged position when the speed of said engine is below a second and lower predetermined limit.

2. In a motor vehicle, in combination, an engine having an intake manifold, a governor driven by the engine, a clutch through which the power of the engine is transmitted to the vehicle, means for locking said clutch in its disengaged position, fluid pressure devices operated by the vacuum in said manifold for disengaging said clutch and for releasing said locking means, and a valve operated by said governor for controlling the application of manifold vacuum to said fluid pressure devices respectively.

3. In a motor vehicle, in combination, an engine, a governor driven thereby, a clutch through which the power of the engine is transmitted to the vehicle, a clutch disengaging member, a clutch pedal having a lost motion connection with said member, clutch operating means controlled by said governor, a flexible element connecting said clutch operating means and disengaging member, and a spring for taking up the slack in said element.

4. In a motor vehicle, in combination, an engine, a clutch through which the power of the engine is transmitted to the vehicle, means for automatically disengaging said clutch when the speed of said engine is below a predetermined limit, means for locking said clutch in disengaged position, and devices for releasing said locking means and re-engaging said clutch when the speed of said engine rises above said limit.

5. In a motor vehicle, in combination, an engine having an intake manifold, a clutch through which the power of the engine is transmitted to the vehicle, means for locking said clutch in its disengaged position, fluid pressure devices operated by the vacuum in said manifold for disengaging said clutch and for releasing said locking means, and a valve for controlling the application of manifold vacuum to said fluid pressure devices respectively.

6. In a motor vehicle, in combination, an engine, a clutch through which the power of the engine is transmitted to the vehicle, means for locking said clutch in its disengaged position, power operated mechanism for disengaging said clutch and for releasing said locking means, and means controlled by the speed of the engine for controlling said mechanism.

7. In a motor vehicle, in combination, an engine, a clutch through which the power of the engine is transmitted to the vehicle, means for disengaging said clutch, means responsive to the speed of said engine for controlling said disengaging means, and means for automatically locking said clutch in disengaged position when said engine stops.

8. In a motor vehicle, in combination, an engine, a clutch through which the power of the engine is transmitted to the vehicle, power operated means for disengaging said clutch, means for locking said clutch in disengaged position, power operated means for moving said locking means to inoperative position, means for supplying power to both of said power operated means including a movable control member, and means for moving said member to predetermined positions in response to predetermined engine speeds to control the power supplied to said power operated means whereby said clutch is disengaged when the speed of the engine falls below a given predetermined rate and is locked in disengaged position when the speed of the engine falls below a lower predetermined rate, said locking means being released and the clutch engaged when the speed of the engine rises above said lower and given rates respectively.

9. In a motor vehicle, in combination, an engine, a clutch through which the power of the engine is transmitted to the vehicle, means for locking said clutch in its disengaged position, power operated means for actuating said locking means, power operated mechanism for disengaging said clutch, and means controlled by the speed of the engine for controlling said mechanism and said power operated means.

STUART G. BAITS.